(12) United States Patent
Lin

(10) Patent No.: US 7,869,449 B2
(45) Date of Patent: Jan. 11, 2011

(54) STATISTIC REPORTING METHOD AND MEDIA GATEWAY

(75) Inventor: Yangbo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 12/358,714

(22) Filed: Jan. 23, 2009

(65) Prior Publication Data

US 2009/0129285 A1    May 21, 2009

Related U.S. Application Data

(63) Continuation of application No. PCT/CN2007/071331, filed on Dec. 26, 2007.

(30) Foreign Application Priority Data

Dec. 30, 2006    (CN) .................. 2006 1 0170443

(51) Int. Cl.
*H04L 12/28* (2006.01)
*H04J 3/06* (2006.01)
(52) U.S. Cl. ...................... 370/401; 370/509
(58) Field of Classification Search ........... 370/400, 370/401, 503, 509
See application file for complete search history.

(56) References Cited

U.S. PATENT DOCUMENTS

| | | | | |
|---|---|---|---|---|
| 7,653,005 | B2 * | 1/2010 | Zou et al. .................. | 370/252 |
| 2003/0177374 | A1 * | 9/2003 | Yung et al. ................ | 713/189 |
| 2004/0170163 | A1 * | 9/2004 | Yik et al. .................. | 370/389 |
| 2006/0056459 | A1 * | 3/2006 | Stratton et al. ............ | 370/503 |

FOREIGN PATENT DOCUMENTS

| | | |
|---|---|---|
| CN | 1791002 A | 6/2006 |
| CN | 1794665 A | 7/2006 |
| CN | 1852347 A | 10/2006 |
| CN | 1874345 A | 12/2006 |
| EP | 0 786 883 A1 | 7/1997 |
| EP | 1 713 229 A1 | 10/2006 |

(Continued)

OTHER PUBLICATIONS

International Search Report issued in corresponding PCT Application No. PCT/CN2007/071331; mailed Apr. 3, 2008.

(Continued)

*Primary Examiner*—Aung S Moe
*Assistant Examiner*—Kerri M Rose
(74) *Attorney, Agent, or Firm*—Brinks Hofer Gilson & Lione

(57) ABSTRACT

A statistic reporting method includes: obtaining the current time information after an MG determines that the statistic parameter value needs to be reported if the reporting of a statistic parameter value needs to be bound to the time information, when associating the current time with the current value of the statistic parameter to be reported, and reporting such information to an MGC. In the present disclosure, the MG associates the current time information with the current value of the statistic parameter to be reported, and reports such information to the MGC, thus enabling the MGC to obtain the correct time of triggering the reporting of the statistic parameter value, reducing errors and improving the accuracy of subsequent analysis and prediction based on the reported statistic parameter value.

15 Claims, 1 Drawing Sheet

FOREIGN PATENT DOCUMENTS

KR    10-2004-0082692    9/2004

OTHER PUBLICATIONS

Supplementary European Search Report issued in corresponding European Patent Application No. 07 84 6157; issued Jun. 19, 2009.

Office Action issued in corresponding Chinese Patent Application No. 2006101704430; issued Nov. 27, 2008.

"Series H: Audiovisual and Multimedia Systems Infrastructure of Audiovisual Services-Communication Procedures" International Telecommunication Union. Sep. 2005.

Office Action issued in corresponding Chinese Patent Application No. 2006101704430; issued Mar. 14, 2009.

Office Action issued in corresponding Chinese Patent Application No. 2006101704430; issued Jan. 22, 2010.

Office Action issued in corresponding Chinese Patent Application No. 200810189680.0; issued Apr. 13, 2010.

Written Opinion of the International Searching Authority issued in corresponding PCT Application No. PCT/CN2007/071331; mailed Apr. 3. 2008.

Partial English Translation of previously submitted International Search Report issued in corresponding PCT Application No. PCT/CN2007/071331.

Office Action issued in corresponding European Patent Application No. 07 846 157.1; issued Sep. 7, 2009.

* cited by examiner

STATISTIC REPORTING METHOD AND MEDIA GATEWAY

RELATED APPLICATIONS

The present application is a continuation of PCT application PCT/CN2007/071331, filed on Dec. 26, 2007, which claims priority to Chinese Patent Application No. 200610170443.0 filed on Dec. 30, 2006, both of which are entitled "Statistic Reporting Method and Media Gateway" and are both hereby incorporated by reference in their entirety.

FIELD OF THE DISCLOSURE

The present disclosure relates to media gateway control technologies, and in particular, to a statistic reporting method and a media gateway (MG).

BACKGROUND OF THE DISCLOSURE

The media gateway controller (MGC) and the media gateway (MG) are two key components in a packet switched (PS) network. The MGC is responsible for the call control function, and the MG is responsible for the service bearer function. In this way, the call control plane is separated from the service bearer plane, thus fully sharing the network resources, simplifying equipment upgrade and service extension, and greatly reducing the development and maintenance costs.

FIG. 1 shows a networking diagram of the MGC and the MG. The widely used protocols for communication between an MGC and an MG include the Gateway Control Protocol (H.248) and the Media Gateway Control Protocol (MGCP). Taking H.284 as an example, various resources on the MG, for example, time division multiplexing (TDM) channels, and Real-time Transfer (RTP) protocol streams, are abstractly represented by terminations; and the combinations of terminations are abstractly represented by contexts. In this protocol-based abstract model, the call connection is actually an operation on a termination and a context. Such operations are performed through command requests and replies between the MGC and the MG. Commands include: Add, Modify, Subtract, Move, AuditValue, AuditCapabilities, Notify, and ServiceChange. Command parameters, also known as descriptors, are categorized into property, signal, event, and statistic. The parameters with service relevance are logically aggregated into a package.

In the H.248 protocol, the parameters related to quality of service (QoS) are generally defined as property parameters or statistic parameters. The statistic parameters are related to the QoS state, for example, the current value or average value applied by a jitter buffer. Such parameters are generally calculated and operated by the MG. The MGC can enable or disable them selectively, namely, activate or deactivate some or all of the statistic parameters.

Currently, the MGC obtains the current values of the statistic parameters on the MG in the two ways: (i) the MGC sends a request command (AuditValue or Subtract) to the MG, and specifies the expected statistic parameter values or applies the default statistic parameter values, and then the MG returns the current value of each statistic parameter to the MGC through a response command; or, (ii) the MGC specifies the conditions for reporting a statistic parameter to the MG, or the MG presets such conditions. When the current value of the statistic parameter meets the conditions, the MG reports the current value of the statistic parameter to the MGC.

In the prior art, if the MG is triggered to report the value of a statistic parameter to the MGC, the reported information contains only the current value of the parameter, without the information about the time of triggering the reporting. According to the received statistic parameter value, the MGC performs subsequent operations. If the time information is required in the analysis and prediction, the time information is subject to the time when the MGC receives the current value of the parameter. However, as affected by various factors such as protocol encoding/decoding, network transmission and message buffer, the time when the MGC receives statistic parameter values is different from the time when the reporting of these statistic parameter values is triggered according to the reporting conditions, and the time deviation is not fixed. This makes it impossible to obtain an accurate time error, thus reducing the accuracy of the subsequent analysis and prediction based on the time information.

SUMMARY OF THE DISCLOSURE

An embodiment of the present disclosure provides a statistic reporting method, which enables an MGC to obtain the correct time corresponding to a statistic parameter value, thus reducing errors.

A statistic reporting method provided by an embodiment of the present disclosure includes:

obtaining, by an MG, current time information upon determining that it is necessary to report a current value of a statistic parameter and that it is necessary to bind time information for reporting of the current value of the statistic parameter;

associating the current time information with the current value of the statistic parameter that needs to be reported; and reporting the associated current time information and statistic parameter value to an MGC.

Further, an MG provided in an embodiment of the present disclosure includes:

a time obtaining module, adapted to obtain current time information;

an associating module, adapted to associate the time information obtained by the time obtaining module with a current value of a statistic parameter that needs to be reported; and a reporting module, adapted to report the time information and the statistic parameter value associated by the associating module, to an MGC.

As seen from the preceding solution, the MG obtains the current time information if the reporting of the statistic parameter value needs to be bound to the time information after determining that it is necessary to report the statistic parameter value, associates the current time information with the current value of the statistic parameter to be reported, and reports the associated time information and the statistic parameter value to the MGC, thus enabling the MGC to obtain the correct time when the reporting of the statistic parameter value is triggered, reducing errors and improving the accuracy of subsequent analysis and prediction based on the reported statistic parameter value.

DETAILED DESCRIPTION OF THE EMBODIMENTS

The main idea of the present disclosure is: According to the conditions for reporting a statistic parameter set in the MG, the MG reports the current statistic parameter value and the current time to the MGC after determining that it is necessary to report the statistic parameter value to the MGC, thus enabling the MGC to obtain the correct time when the reporting of the statistic parameter value is triggered, reducing errors and improving the accuracy of subsequent analysis and prediction based on the reported statistic parameter value.

Here the MG may determine that it is necessary to report the current value of the statistic parameter when the current value of the statistic parameter meets the conditions for reporting the statistic parameter.

Whether it is necessary to bind the reporting of the statistic parameter value with the time information depends on the setting of the time binding request parameter. The time binding request parameter may be sent by the MGC to the MG. Specifically, the time binding request parameter may be carried in the event sent by the MCG to the MG. The time binding request parameter may be preset in the MG by the MG.

Moreover, the time binding request parameter may be set in this way: (i) the presence of the parameter indicates that the time information needs to be bound; the absence of the parameter indicates that the time information does not need to be bound; or, (ii) the value of the parameter may be Bind, which indicates that the time information needs to be bound, or NoBind, which indicates that the time information does not need to be bound, or Auto, which indicates the MG decides whether to bind the time information.

The preceding operations of associating the current time information with the current value of the statistic parameter to be reported, and reporting the associated time information and statistic parameter value to the MGC may include:

adding a parameter that indicates the time information to an event reported by the MG to the MGC, so as to associate the time information with the statistic parameter value in the reported event; and sending the reported event to the MGC.

The preceding operations of associating the current time information with the current value of the statistic parameter to be reported, and reporting the associated time information and statistic parameter value to the MGC may further include:

setting time information in the timestamp parameter that is sent with the reported event to the MGC;
associating the time information with the statistic parameter value included in the reported event; and
sending the reported event with the timestamp parameter to the MGC.

Based on the preceding idea, the present disclosure provides a statistic reporting method. The method is hereinafter described in detail with reference to the embodiments.

Figure 1:
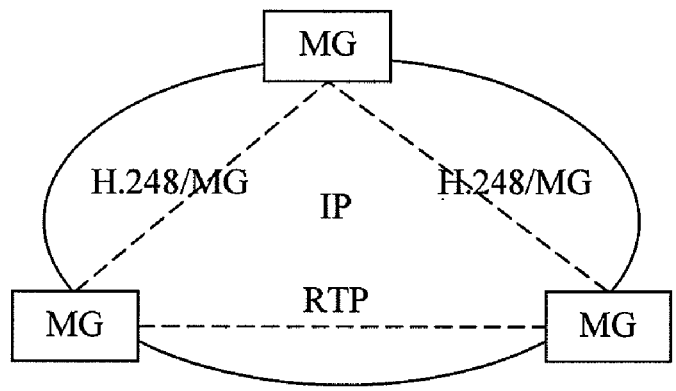
FIG. 1 shows the networking of an MGC and an MG.
Figure 2:
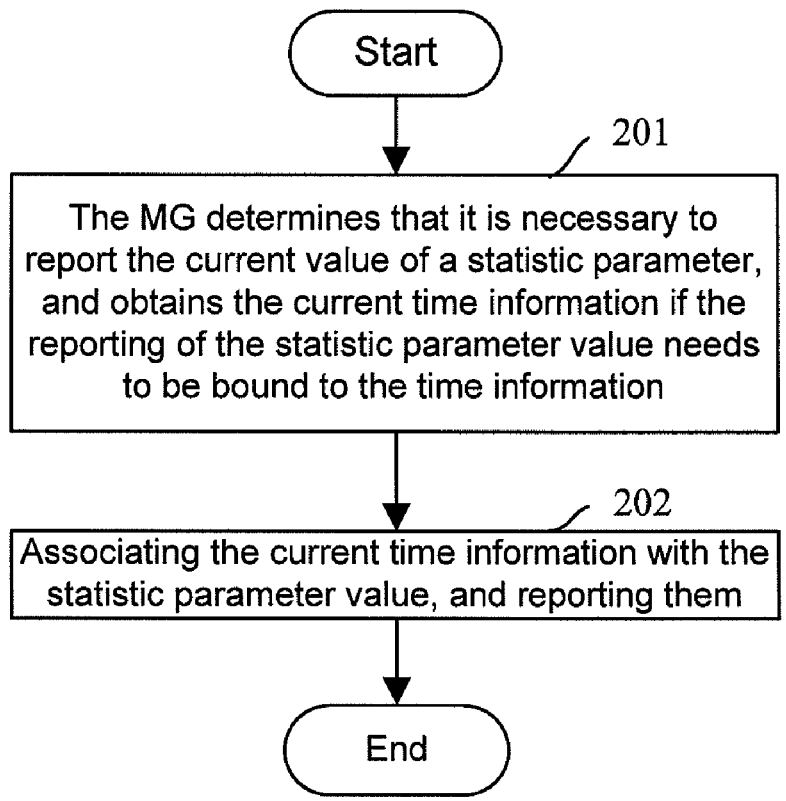
FIG. 2 is a flowchart of the statistic reporting method according to an embodiment of present disclosure.

As shown in FIG. 2, the process of a statistic reporting method according to an embodiment of the present disclosure includes the following steps:

Step 201: The MG determines that it is necessary to report the current value of a statistic parameter, and obtains the current time information if the reporting of the statistic parameter value needs to be bound to the time information.

In step 201, the MG may determine that it is necessary to report the current value of the statistic parameter when the current value of the statistic parameter meets the conditions for reporting the statistic parameter. In this case, the current time information obtained by the MG is the time when the current value of the statistic parameter meets the conditions for reporting the statistic parameter. The time is hereinafter referred to as the triggering time. The statistic parameters herein may include various statistic parameters mentioned in the H.248 protocol, for example, RTP packet loss ratio on a termination.

The preceding conditions for reporting the statistic parameters may be sent by the MGC to the MG, or set by the MG. In the process of setting a statistic parameter based on conditional reporting, an extended parameter may be used to indicate whether to report the triggering time, so as to determine whether the reporting of the statistic parameter value needs to be bound to the time information. In this embodiment, the extended parameter indicating whether to report the triggering time is named TimeBindRequest (TBR).

This embodiment provides two modes of setting the foregoing TBR parameter: (i) the TBR parameter is used to indicate the necessity of binding time information, namely, in the process of setting the statistic parameter based on conditional reporting, if the TBR parameter is present, the time information must be bound, which means that the triggering time must be reported when the statistic parameter value is reported; if the TBR parameter is absent, the time information does not need to be bound, which means that the triggering time does not need to be reported when the statistic parameter value is reported; or vice versa; (ii) the value of the TBR parameter is used to indicate whether it is necessary to bind the time information. For example, the values of the TBR parameter include: Bind, NoBind, and Auto. One of the three values may be used by default, namely, in the process of setting the statistic parameter based on conditional reporting, different values of the TBR parameter indicate different requirements.

In the H.248 protocol, an event is used to monitor whether the conditions for reporting the statistic parameter are met. Therefore, the preceding TBR parameter may be set in an event descriptor.

In this case, when the MG determines that the current statistic parameter value meets the conditions for reporting the statistic parameter sent by the MGC or set by the MG, the MG checks the setting of the preceding TBR parameter and judges whether the reporting of the statistic parameter value needs to be bound to the time information. If no binding is required, the MG reports the statistic parameter value directly; if binding is required, the MG obtains the triggering time, namely, it obtains the current time information in step 201, and then the process proceeds to step 202.

In the preceding first mode of setting the TBR parameter, to judge whether the reporting of the statistic parameter value needs to be bound to the time information is to judge whether the TBR parameter is present in the process of setting the statistic parameter based conditional reporting; if the TBR parameter is present, the time information must be bound; otherwise, the time information does not need to be bound; or vice versa. In the preceding second mode of setting the TBR parameter, the value of the TBR parameter is used as a basis for judging. If the TBR parameter value is Bind, the time information must be bound; if the TBR parameter value is NoBind, the time information does not need to be bound; if the TBR parameter value is Auto, the MG decides whether to bind the time information according to the policy set by the MG about whether to report the triggering time.

Step 202: Associating the current time information obtained in step 201 with the value of the statistic parameter to be reported, and reporting the associated time information and statistic parameter value to the MGC.

In step 202, associating the statistic parameter value with the current time information may be an operation of binding them into one command which is subsequently reported to the MGC. Because a command can carry the statistic parameter value to be reported through a reported event, this embodiment provides two reporting modes of binding the current time information to the statistic parameter value: (i) extending a parameter TriggerTime (TT) which indicates the time information, for the reported event. The parameters of the reported event include the current value of the statistic parameter, so the TT parameter can be set to a value equivalent to the current time information obtained in step 201, so as to bind the current time information to the statistic parameter value; (ii) setting the current time information obtained in step 201 in the timestamp parameter generally used for reporting an event, which binds the current time information to the statistic parameter value because the current time information and the statistic parameter value are carried in the reported event concurrently.

The process of this embodiment is further described below through an example: The MGC sends an Add, Move or Modify command to the MG, with the command carrying an event that includes the following parameters: StatisticID=rtp/pl, max=20% and tbr=Bind. The parameter StatisticID=rtp/pl is designed to identify that the event is specific to the RTP packet loss ratio parameter; max=20% is a reporting condition, that is, the parameter needs to be reported when the maximum value of the RTP packet loss ratio is 20%; tbr=Bind indicates that the time information must be reported.

In this case, after the MG receives the Add, Move or Modify command, the MG retrieves the event from the command, and monitors whether the RTP packet loss ratio reaches 20% according to StatisticID=rtp/pl, max=20% and the RTP packet loss ratio calculated in real time or periodically. Supposing at 2006-08-08 12:34:56, the MG detects that the RTP packet loss ratio on a termination reaches 20% and the MG determines the time information must be reported according to tbr=Bind in the retrieved event, the MG obtains the triggering time (namely, 2006-08-08 12:34:56), and reports the triggering time and the corresponding RTP packet loss ratio to the MGC through a Notify command that carries the reported event. The carried event contains: StatisticID=rtp/pl, val=20% and tt=20060808123456. val=20 indicates that the current RTP packet loss ratio value is 20%; tt=20060808123456 indicates that the triggering time is 2006-08-08 12:34:56.

Further, an embodiment of the present disclosure provides an MG. The MG includes:
a time obtaining module, adapted to obtain the current time information;
an associating module, adapted to associate the time information obtained by the time obtaining module with the current value of a statistic parameter to be reported; and
a reporting module, adapted to report the time information and the statistic parameter value, which are associated by the associating module, to an MGC.

The associating module further includes: a time reporting decision unit, adapted to decide whether the associating module executes the operation of associating the time information obtained by the time obtaining module with the current value of the statistic parameter to be reported, depending on the value of the TBR parameter and the presence of the TBR parameter.

The MG further includes: a receiving module, adapted to receive the event parameters sent by the MGC, and send the TBR parameter in the event parameters to the time reporting decision unit.

In the preceding embodiments, the MG reports the accurate time when the statistic parameter value occurs while reporting the statistic parameter value to the MGC, thus improving the accuracy of analysis and prediction performed by the MGC according to the reported statistic parameter value and the time parameter.

The present disclosure has been described through some exemplary embodiments. In the practical application, those skilled in the art may make improvements according to the exemplary embodiments of the present disclosure in order to meet the specific requirements. It should be understood that the exemplary embodiments of the present disclosure are not intended to limit the scope of protection of the present disclosure.

What is claimed is:

1. A method for statistic reporting, comprising:
obtaining, by an Media Gateway (MG), current time information upon determining that it is necessary to report a current value of a statistic parameter and that it is necessary to bind time information for reporting of the current value of the statistic parameter;
associating the current time information with the current value of the statistic parameter that needs to be reported;
reporting the associated current time information and statistic parameter value to a Media Gateway Controller (MGC);
wherein the determining that it is necessary to bind time information for reporting of the current value of the statistic parameter, comprises: determining, by the MG, whether it is necessary to bind the time information for reporting of the current value of the statistic parameter according to a set time binding request parameter; and
wherein before determining, by the MG, whether it is necessary to bind the time information for reporting of the current value of the statistic parameter value according to the set time binding request parameter, the method further comprises: setting, by the MGC, the time binding request parameter and sending the time binding request parameter to the MG.

2. The method according to claim 1, wherein the determining, by the MG, that it is necessary to report the current value of the statistic parameter, comprises:
determining, by the MG, that it is necessary to report the current value of the statistic parameter when the current value of the statistic parameter meets the conditions for reporting the statistic parameter.

3. The method according to claim 1, wherein determining, by the MG, whether it is necessary to bind the time information for reporting of the current value of the statistic parameter according to a set time binding request parameter, comprises:
determining that it is necessary to bind the time information for reporting of the current value of the statistic parameter according to a presence of the set time binding request parameter.

4. The method according to claim 1, wherein determining, by the MG, whether it is necessary to bind the time information for reporting of the current value of the statistic parameter according to a set time binding request parameter, comprises:
determining that it is not necessary to bind the time information for reporting of the statistic parameter value according to the absence of the set time binding request parameter.

5. The method according to claim 1, wherein sending, by the MGC, the time binding request parameter to the MG, comprises:
sending, by the MGC, an event parameter comprising the time binding request parameter to the MG.

6. The method according to claim 1, wherein setting, by the MGC, the time binding request parameter, comprises:
   setting, by MGC, a value of the time binding request parameter, the value indicating at least one of: that the time information needs to be bound, that the time information need not to be bound, and that whether to bind the time information is decided by the MG.

7. The method according to claim 1, wherein associating the current time information with the current value of the statistic parameter that needs to be reported and reporting the associated current time information and the current value of the statistic parameter to the MGC, comprises:
   adding a parameter indicating the current time information to an event parameter that reports the current value of the statistic parameter, by the MG to the MGC,
   associating the current time information with the current value of the statistic parameter in the event parameter, and
   sending the event to the MGC.

8. The method according to claim 1, wherein associating the current time information with the current value of the statistic parameter that needs to be reported and reporting the associated time information and the current value of the statistic parameter to an MGC, comprises:
   setting the current time information in a timestamp parameter sent with a reported event to the MGC;
   associating the current time information with the current value of the statistic parameter in the reported event, and
   sending the reported event and the timestamp parameter to the MGC.

9. A Media Gateway, MG, configured:
   to obtain current time information;
   to associate the current time information with a current value of a statistic parameter that needs to be reported, wherein associating further comprises a time reporter to decide whether to associate the current time information with the current value of the statistic parameter to be reported, according to a set time binding request parameter;
   to receive event parameters sent by a Media Gateway Controller (MGC), and send the time binding request parameter in the event parameters to the time reporter; and
   to report the associated current time information and the statistic parameter value to the MGC.

10. A method for statistic reporting, comprising:
    obtaining, by an Media Gateway (MG), current time information upon determining that it is necessary to report a current value of a statistic parameter and that it is necessary to bind time information for reporting of the current value of the statistic parameter;
    associating the current time information with the current value of the statistic parameter that needs to be reported;
    reporting the associated current time information and statistic parameter value to a Media Gateway Controller (MGC);
    wherein the determining that it is necessary to bind time information for reporting of the current value of the statistic parameter, comprises: determining, by the MG, whether it is necessary to bind the time information for reporting of the current value of the statistic parameter according to a set time binding request parameter; and
    wherein before determining, by the MG, whether it is necessary to bind the time information for reporting of the current value of the statistic parameter value according to the set time binding request parameter, the method further comprises: setting, by the MG, the time binding request parameter.

11. The method according to claim 10, wherein the determining, by the MG, that it is necessary to report the current value of the statistic parameter, comprises:
    determining, by the MG, that it is necessary to report the current value of the statistic parameter when the current value of the statistic parameter meets the conditions for reporting the statistic parameter.

12. The method according to claim 10, wherein determining, by the MG, whether it is necessary to bind the time information for reporting of the current value of the statistic parameter according to a set time binding request parameter, comprises:
    determining that it is necessary to bind the time information for reporting of the current value of the statistic parameter according to a presence of the set time binding request parameter.

13. The method according to claim 10, wherein determining, by the MG, whether it is necessary to bind the time information for reporting of the current value of the statistic parameter according to a set time binding request parameter, comprises:
    determining that it is not necessary to bind the time information for reporting of the statistic parameter value according to the absence of the set time binding request parameter.

14. The method according to claim 10, wherein associating the current time information with the current value of the statistic parameter that needs to be reported and reporting the associated current time information and the current value of the statistic parameter to the MGC, comprises:
    adding a parameter indicating the current time information to an event parameter that reports the current value of the statistic parameter, by the MG to the MGC,
    associating the current time information with the current value of the statistic parameter in the event parameter, and
    sending the event to the MGC.

15. The method according to claim 10, wherein associating the current time information with the current value of the statistic parameter that needs to be reported and reporting the associated time information and the current value of the statistic parameter to an MGC, comprises:
    setting the current time information in a timestamp parameter sent with a reported event to the MGC;
    associating the current time information with the current value of the statistic parameter in the reported event, and
    sending the reported event and the timestamp parameter to the MGC.

* * * * *